J. C. Plumer,
Shoe Lasts,
Nº 51,968.  Patented Jan. 9, 1866.
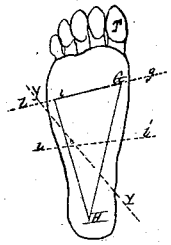
FIG. 1.
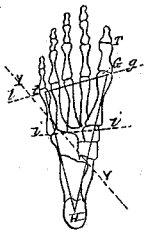
FIG. 2.
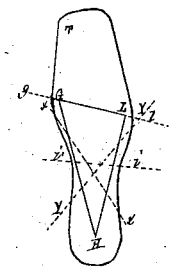
FIG. 3.
FIG. 4.
FIG. 5.
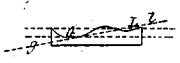
FIG. 6.
FIG. 7.
FIG. 8.
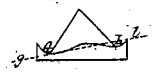
FIG. 9.
FIG. 10.
FIG. 11.
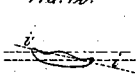
FIG. 12.
FIG. 13.
FIG. 14.
FIG. 15.
FIG. 16.
FIG. 17.
FIG. 18.
FIG. 19.
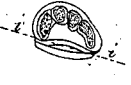
FIG. 20.
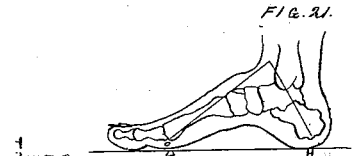
FIG. 21.
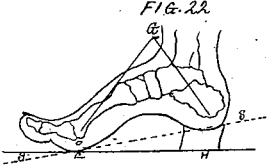
FIG. 22.
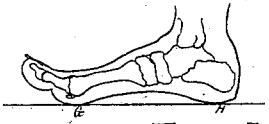
FIG. 23.
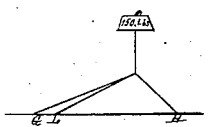
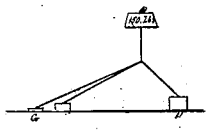
Witnesses:
William H. Clifford
James W. Gage.
Inventor:
J. C. Plumer

UNITED STATES PATENT OFFICE.

J. C. PLUMER, OF BOSTON, MASSACHUSETTS.

IMPROVEMENT IN BOOTS AND SHOES.

Specification forming part of Letters Patent No. 51,968, dated January 9, 1866; antedated December 26, 1865.

*To all whom it may concern:*

Be it known that I, J. C. PLUMER, of Boston, in the Commonwealth of Massachusetts, have invented a new and useful Improvement in Boots and Shoes; and I hereby declare the following to be a full, clear, and exact description thereof, reference being had to the accompanying drawings, making part of this specification, in which—

Figure 1 represents a view of the bottom or sole of the human foot; Fig. 2, a view of the skeleton or bony structure of the sole; Fig. 3, a view of the upper or treading surface of the sole of my improved boot or shoe. Fig. 4 represents a vertical transverse section of Fig. 1 inverted at C L, the ball portion of the foot showing a natural transverse inclination of surface indicated by the line $g\ l$, the outer margin of the foot being on a horizontal plane above that of the inner margin; Fig. 5, a vertical transverse section of Fig. 2 inverted, on the same line and showing the same inclination of surface and same horizontal plane as in Fig. 4; Fig. 6, a vertical transverse section of Fig. 3 at C L, the sole of the improved boot and shoe showing the same planes and inclination of surface as in Figs. 4 and 5. Fig. 7 represents a tripod having each foot resting on the same horizontal plane; Fig. 8, a tripod having each foot resting on different horizontal planes. Fig. 9 represents the feet G L of the tripods, Figs. 7 and 8, resting upon the margins G L of the upper surface of Fig. 3, the sole of the improved boot or shoe showing the sole thinner beneath the foot G than L, and showing the same planes and inclination of surface as in Figs. 1 to 6, inclusive. Fig. 10 shows a vertical transverse section of Fig. 1 inverted at $i\ i$, the instep or shank or waist portion showing an opposite inclination of the surface from that of the ball portion in Fig. 4. Fig. 11 represents a vertical transverse section of Fig. 2 inverted at $i\ i$, the instep portion showing the same inclination of surface as in Fig. 10; Fig. 12, a vertical transverse section of Fig. 3 at $i\ i'$, showing same inclination of surface as in Figs. 10 and 11; Figs. 13, 14, and 15, vertical transverse sections of the ball portion of the boots and shoes as commonly constructed, supporting the corresponding or ball portion of the foot, the parts beneath the inner and outer margins of the foot at G L of the tripod being of the same thickness, and hence supporting these G L of the tripod on the same horizontal plane; Figs. 16, 17, and 18, vertical transverse sections of the instep portion of the soles of boots and shoes as commonly made supporting the corresponding portion of the foot, the parts beneath the outer and inner margins of the foot at this point being on the same horizontal plane; Figs. 19 and 20, respectively, vertical transverse sections of the ball portion and the instep or shank portion of the sole of my improved boot or shoe supporting the corresponding portions of the foot, showing their coaptation thereto, and the parts beneath the outer and inner margins of the foot on different horizontal planes and inclinations of surface opposed to each other, the great-toe joint being the lowest point on the inner margin, and the instep or shank portion lowest on the outer margin of the foot; Fig. 21, a vertical longitudinal section of that portion of the human foot represented by the legs H G of the tripod, Fig. 7, resting upon a flat surface and on the same horizontal plane, showing the horizontal bearings of this portion of the human foot in a condition of nature; Fig. 22, a vertical longitudinal section of that portion of the human foot represented by the legs H G of the tripod, Fig. 7, resting on the longitudinal inclinations $s\ s$ of a boot or shoe as commonly constructed, the foot H of the tripod being supported on a plane above that of the foot G. The inevitable mechanical tendency of this condition of the bearing-points of the foot is to thrust the great-toe joint (foot G of the tripod) unduly against the sole in the direction of the line G G at the same time the point of the toe is turned upward. Fig. 23, a section corresponding with that of Figs. 21 and 22, showing the resulting mechanical distortion upon the mechanism of the great-toe joint from a continuance of the above cause.

The object of my invention is to produce from the manufacturer a boot or shoe with the upper or treading surface of the sole more in accordance with the configuration of the sole of the human foot and better adapted to its requirements than as usually constructed.

My invention consists in constructing or making a boot or shoe with a sole having a certain configuration of upper or treading surface, consisting in certain transverse and diagonal inclinations thereof, which shall have a general adaptation to those of the sole of the foot, and certain depressions or bearing-points for the reception and adjustment of the three natural protuberances or bearings H C L, Figs. 1 and 2, of the sole of the foot.

Inspection of the under surface of the human foot shows a general transverse inclination downward and inward from the joint of the little toe to that of the great toe, (shown by the lines $l\ g$, Figs. 1, 4, and 5,) the prominences or under surfaces of these joints being on different horizontal planes; also, a general transverse inclination downward and outward in the shank portion, or that portion beneath the instep. (Shown by the line $i\ i$, Figs. 1, 7, and 8.)

My invention may be divided into four parts: The heel portion, designed to support the heel portion of the tripod, Figs. 1 and 7 at H; the shank portion, designed to come beneath the shank or waist of the foot, (this is seen at the line $i\ i$, Fig. 3;) the ball portion, designed to support the ball of the foot—feet G L of the tripod; and the toe portion, designed to come in contact with the under surface of the great toe. Of these the ball and shank portions are the most important, and the subject of specification.

The ball portion is located on the line $l\ g$, Fig. 3, and has an inclination downward and inward from $l$ to $g$ of the upper or treading surface, with two depressions, G and L, (shown by the line $l\ g$, Fig. 6,) and is designed to coapt itself to the corresponding portion of the sole of the foot.

The shank portion is located on the line $i'\ i$, Fig. 3, having an inclination downward and outward of the upper or treading surface, (shown by the line $i'\ i$, Fig. 12, a section of Fig. 3 at $i'\ i$,) and designed to coapt itself to the corresponding portion of the foot.

Intermediate between the inclinations of surface of the ball and shank portions, as described, are diagonal inclinations forward and outward and inward on the lines $y\ y$ and $x\ x$, Fig. 3, designed to coapt themselves to those of that portion of the sole of the foot comprised between the ball and shank portions thereof. This conformation of the upper or treading surface of a boot or shoe sole, with the above-described inclinations and depressions for the reception of the three feet of the tripod—together with certain intermediate convexities, the subject of Letters Patent of June 4, 1861—is the counterpart of the bottom or sole of the natural human foot. These features are readily distinguishable in the sole of a boot or shoe that has been broken in by long usage and conformed itself in some degree to the shape of the wearer's foot. Such a conformation of sole may therefore be regarded as being an indication of the requirements of the foot in its artificial condition of being shod.

Hitherto in the construction of boots and shoes it has been customary to make the soles of the same thickness beneath the outer and inner margins of the ball portion of the foot, as shown in Figs. 13, 14, and 15, supporting the joints of the great and little toes (feet G L of the tripod, Fig. 7) on the same horizontal plane. This is found to restrain the motions of the great-toe joint, on which the entire weight of the body is thrown at each step, and is the direct mechanical cause of many painful affections of this joint, which, in complication of structure and functional importance, is second only to the knee-joint, which it closely resembles in construction, the sesamoid bones corresponding with the patella or knee-pan, and the tendonous attachments of these bones corresponding with those of the patella.

The union of the longitudinal and transverse arches of the human foot constitute an elastic and adjustable tripod, (illustrated by Fig. 7,) with legs of unequal length and feet of different form and size, H C L, Figs. 1 and 2, upon which the superimposed weight of the body is supported. In a natural condition, with the organism of the foot unrestrained by covering, this elastic adjustable tripod will accommodate itself to all the varying forms of natural surfaces, will coapt itself to depressions, as on the earth's surface, and grasp the convexity of the rail or tight-rope. With the foot as commonly shod these conditions are changed. The heel portion H of the tripod is supported on a higher plane than the others, C L, which are supported on the same horizontal plane.

Observation and experience teach that, whatever the original form of the ball portion of the sole of a boot or shoe, by usage it becomes transversely flat on the under surface, concavo-convex on the upper surface, with a general inclination of the upper surface downward and inward to the point occupied by the great-toe joint, which is the lowest point, the sole having here become indented by the pressure of this joint and worn off on the under surface, leaving the sole thinner, and thus supporting the foot G of the tripod on a point lower than that of the foot L. Upon this conformation of the upper or treading surface of the sole, produced by the foot in asserting its requirements, each separate foot of the tripod will rest on a different horizontal plane, H being the highest, G the lowest, and L between them, Fig. 8. Regarding this as an indication of the position in which the foot should be supported under the restraints of dress, such conformation of sole should be originally imparted to the treading-surface of the sole of a boot or shoe.

Without alluding to the elevating of the foot H of the tripod above the planes of the other feet, it is apparent that this elevation by the use of the boot-heel has a tendency to throw more weight upon the foot G of the tripod or great-toe joint in the direction of the line G G, Fig. 22, especially if resting upon the same transverse plane with the foot L or joint of the lesser toe. This undue weight thrown upon the joint of the great toe by the of the boot-heel renders especial provision its bearing more necessary, or else, with a long succession of illy-constructed boot and shoe soles, the foot becomes gradually distorted, the great-toe joint sublexated, the longitudinal or instep arch of the foot depressed, and bunion and splay-foot are the consequences.

To enable others skilled in the art to make my invention, I will describe its construction.

My improved boot or shoe admits of a variety of modes of construction. It may be made by molding or fashioning a piece of wood or other material so that it shall have the characteristics of treading-surface herein described, inserting it into a boot or shoe of ordinary construction, and securing it thereto by any suitable means; or a boot or shoe may be made with a sole of a single thickness of wood, rubber, or other material, molded and fashioned in any way or by any suitable means, so as to have the characteristics of surface described, and the upper secured by any suitable means. Another and perhaps a more practicable means is to make the sole of the boot or shoe of leather by the ordinary process, but using a last having a sole or under surface the counterpart of the upper surface required on the sole of the boot or shoe. In this case and by this method of construction there should be an extra thickness given to that portion of the sole designed to support the outer margin of the front part of the foot. This may be accomplished by adding an extra thickness of leather or other suitable material to this part or by diminishing the thickness of the sole beneath the inner margin of the front part of the foot by shaving off or extra hammering.

What I claim as my invention, and desire to secure by Letters Patent, is—

1. A boot or shoe constructed with the inclinations of the upper or treading surface of the sole, as described.
2. The depressions G L, as described.
3. The surfaces, as described, in combination with the depressions, as described.
4. Constructing a boot or shoe having a sole with the inclinations of surface and the depressions, as described.
5. A boot or shoe with the inclinations and depressions of the treading-surface of the sole, as and for the purposes described.

J. C. PLUMER.

Witnesses:
WILLIAM H. CLIFFORD,
HANNO W. GAZE.